United States Patent
Ogino

(10) Patent No.: US 7,353,291 B1
(45) Date of Patent: Apr. 1, 2008

(54) NETWORK STATUS SERVER, INFORMATION DISTRIBUTION SYSTEM, CONTROL METHOD, AND STORAGE MEDIUM FOR STORING CONTROL PROGRAM

(75) Inventor: Tsukasa Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1237 days.

(21) Appl. No.: 09/597,145

(22) Filed: Jun. 20, 2000

(30) Foreign Application Priority Data

Jun. 24, 1999 (JP) ................................. 11-178474

(51) Int. Cl.
*G06F 15/177* (2006.01)

(52) U.S. Cl. ........................ 709/239; 709/203; 709/204; 709/220; 709/223; 709/224; 709/238; 709/241

(58) Field of Classification Search ................ 709/105, 709/220, 203, 204, 223, 224, 238, 239, 241
See application file for complete search history.

(56) References Cited

U.S. PATENT DOCUMENTS

| | | | | |
|---|---|---|---|---|
| 5,774,660 A | * | 6/1998 | Brendel et al. | 709/201 |
| 6,128,644 A | * | 10/2000 | Nozaki | 709/203 |
| 6,205,477 B1 | * | 3/2001 | Johnson et al. | 709/220 |
| 6,324,580 B1 | * | 11/2001 | Jindal et al. | 709/228 |
| 6,327,622 B1 | * | 12/2001 | Jindal et al. | 709/228 |
| 6,477,522 B1 | * | 11/2002 | Young | 707/2 |
| 6,513,061 B1 | * | 1/2003 | Ebata et al. | 709/203 |
| 6,578,066 B1 | * | 6/2003 | Logan et al. | 718/105 |
| 6,711,137 B1 | * | 3/2004 | Klassen et al. | 370/252 |
| 6,748,426 B1 | * | 6/2004 | Shaffer et al. | 709/219 |
| 6,795,434 B1 | * | 9/2004 | Kumar et al. | 370/392 |
| 6,795,858 B1 | * | 9/2004 | Jain et al. | 709/226 |
| 6,850,980 B1 | * | 2/2005 | Gourlay | 709/226 |
| 6,963,847 B1 | * | 11/2005 | Kennedy et al. | 705/8 |
| 7,113,986 B2 | * | 9/2006 | Goldszmidt et al. | 709/223 |
| 2005/0018611 A1 | * | 1/2005 | Chan et al. | 370/241 |

FOREIGN PATENT DOCUMENTS

EP 0 959 601 11/1999

OTHER PUBLICATIONS

J.D. Guyton, et al., "Locating Nearby Copies Of Replicated Internet Servers", Computer Communication Review, Association For Computing Machinery, New York, US, vol. 25, No. 4, pp. 288-298,Oct. 1, 1995.

(Continued)

*Primary Examiner*—David Wiley
*Assistant Examiner*—Alina Boutah
(74) *Attorney, Agent, or Firm*—Fitzpatrick, Cella, Harper & Scinto

(57) ABSTRACT

There is disclosed a network status server for receiving an inquiry from a web server accessed by a client, and using path information and determining the optimum web server to return a response to the accessed web server. The web server receiving the response instructs the client to access the optimum web server from the next time. In this constitution, accesses among the dispersed/arranged web server sites are leveled, and access loads can be leveled even among the web servers in the respective web server sites. Moreover, the client can access the optimum web server.

36 Claims, 9 Drawing Sheets

OTHER PUBLICATIONS

Z. Fei, et al., "A Novel Server Selection Technique for Improving the Response Time of a Replicated Service", IEEE Infocom '98 17th Annual Joint Conference of the IEEE Computer and Communications Societies IEEE San Francisco, CA, USA, Mar. 29-Apr. 2, 1998, pp. 783-791.

P. Francis, et al., "An Architecture for a Global Internet Host Distance Estimation Service", IEEE Infocom '99. The Conference On Computer Communications. 18th Annual Joint Conference of the IEEE Computer and Communications Societies. New York, NY, Mar. 21-25, 1999, vol. 1, pp. 210-217.

* cited by examiner

NETWORK STATUS SERVER, INFORMATION DISTRIBUTION SYSTEM, CONTROL METHOD, AND STORAGE MEDIUM FOR STORING CONTROL PROGRAM

BACKGROUND OF THE INVENTION

1. Field of the Invention

The present invention relates to a network status server for distributing large-capacity data on a network, an information distribution system, a control method, and a storage medium for storing a control program.

Particularly, the present invention relates to a network status server, an information distribution system, a control method and a storage medium for storing a control program when a plurality of dispersed/arranged information distribution servers are controlled.

2. Related Background Art

As one of information distribution techniques using Internet, World Wide Web (hereinafter referred to as Web) has generally been used. This technique comprises: operating a web server software on a general computer (information processor); and distributing information such as contents (characters, charts, tables, and the like) described in an HTML language. The computer as a client which accesses a server (hereinafter referred to as the access client) may be connected to the server via a network, and free perusal is possible with a general-purpose perusal software (browser). In recent years, a web server site accessible to the entire world has appeared and the importance has further increased. On the other hand, when the web server has been accessed from the entire world in a concentrated manner, a large load is applied to the connection network, and the web server. To solve the problem, several techniques are currently proposed as countermeasures. The techniques will briefly be described with reference to FIGS. 6 and 7.

First, a system in which a virtual host computer is utilized as shown in FIG. 6 is proposed as a technique of dispersing accesses concentrated to the web server. This aims at dispersing the above-described load to a plurality of servers. In this example, it is supposed that the access client accesses URL (access address) of www.abcde.jp. In the access to www.abcde.jp, first the virtual host computer is accessed. The virtual host computer intends to appropriately disperse the accesses from the load situation of the respective subordinate web servers. Actually, any one of www1, www2, www3 distributes predetermined information in response to the access from the client, but the virtual host computer once accepts the access to appropriately disperse the access. Moreover, a transfer system by TCP connection hop is proposed. The system will be described with reference to FIG. 7. When there is an access from the client, first www1 is accessed. In the www1, a scheduler operates, and selects the optimum web server www3, and responds to the access from the client.

Specifically, the www1 constantly responds to an access request, and the optimum web server (www1, www2, www3) responds. In this system, the access dispersion is intended in the schedule function.

However, the above-described conventional access dispersion system has the following problems.

1) When the virtual host computer shown in FIG. 6 is utilized, a problem occurs that a device serving as an exclusive virtual host computer is separately necessary.

2) Moreover, when the exclusive virtual host computer temporarily accepts all the accesses, and when there are many accesses, the processing ability of the virtual host computer raises a problem. Specifically, the processing ability of the virtual host computer substantially indicates the processing ability of the web server site (the site in which the web server operates).

3) Moreover, in the virtual host computer system, the access is accepted in the server site in which the virtual host computer is present, the access of the web server in its own server site is leveled, and the respective virtual host computers are necessary for the respective web server sites provided with the dispersed/arranged web servers. Moreover, predetermined different URLs need to be set in the respective virtual host computers. Therefore, a problem occurs that the accessing client has to select the dispersed/arranged web server site by itself.

4) Furthermore, since the accessing client selects the web server site, a problem occurs that the accesses to the respective web server sites cannot be leveled.

However, the transfer system by the TCP connection hop as shown in FIG. 7 has an advantage that, different from the virtual host computer system, a mechanism for temporarily accepting the exclusive access is not separately necessary.

5) However, the accesses are concentrated on the web server in which the scheduler is permanently stationed. Therefore, if a trouble is generated in the web server in which the scheduler is permanently stationed, a problem occurs that the entire server site cannot function.

6) Moreover, in this system, the access to the dispersed/arranged web server site cannot be controlled to the optimum. Since the system is constituted for a purpose of leveling the access in the web server site (in its own network) managed by the scheduler, predetermined different URLs need to be set in the respective web server sites similarly as the above-described virtual site system. Therefore, there is a problem that the accessing client selects the dispersed/arranged web server site by itself.

7) Furthermore, similarly as the above-described virtual site system, since the accessing client selects the web server site, the accesses to the respective web server sites cannot be leveled.

SUMMARY OF THE INVENTION

The present invention is constituted by a network status server comprising: logical distance obtaining means for obtaining respective logical distances between respective sites provided with dispersed/arranged information distribution servers and an accessed client; and site determination means for determining an optimum site from the respective sites provided with the dispersed/arranged information distribution servers based on the obtained logical distances.

Moreover, the present invention is constituted by a network status server comprising: logical distance obtaining means for obtaining respective logical distances between respective sites provided with dispersed/arranged information distribution servers and an accessed client; collection means for collecting network state information between the respective sites provided with the dispersed/arranged information distribution servers and the accessed client, and state information in the site provided with the dispersed/arranged information distribution servers; and server determination means for determining the optimum information distribution server from the dispersed/arranged information distribution servers based on the logical distance obtained by the logical distance obtaining means, the network state information between the respective site provided with the dispersed/arranged information distribution servers and the accessed client, and the state information in the sites provided with the dispersed/arranged information distribution servers collected by the collection means.

Furthermore, the present invention is constituted by a network status server comprising: logical distance obtaining means for obtaining respective logical distances between respective sites provided with dispersed/arranged information distribution servers and an accessed client; collection means for collecting network state information between the respective sites provided with the dispersed/arranged information distribution servers and the accessed client, and state information in the site provided with the dispersed/arranged information distribution servers; site determination means for, when it is judged that the access from the client is a first access, determining an optimum site from the respective sites provided with the dispersed/arranged information distribution servers based on the logical distance obtained by the logical distance obtaining means; first server determination means for determining an optimum information distribution server from the information distribution servers in the optimum site determined by the site determination means based on a predetermined condition; and second server determination means for, when it is judged that the access from the client is not the first access, determining the optimum information distribution server from the dispersed/arranged information distribution servers based on the logical distance obtained by the logical distance obtaining means, the network state information between the respective sites provided with the dispersed/arranged information distribution servers and the accessed client, and the state information in the site provided with the dispersed/arranged information distribution servers collected by the collection means.

Moreover, according to the present invention, there is provided an information distribution system comprising: dispersed/arranged information distribution servers; and a network status server.

The information distribution server comprises: inquiry means for inquiring of the network status server about the optimum information distribution server among the dispersed/arranged information distribution servers in response to an accessing client; response reception means for receiving a response from the network status server; and indication means for indicating the optimum information distribution server to the accessing client. The network status server comprises: inquiry reception means for receiving the inquiry from the inquiry means; logical distance obtaining means for obtaining respective logical distances between respective sites provided with the dispersed/arranged information distribution servers and the accessed client; site determination means for determining the optimum site from the respective sites provided with the dispersed/arranged information distribution servers based on the obtained logical distance; server determination means for determining the optimum information distribution server from the information distribution servers in the optimum site determined by the site determination means based on a predetermined condition; and response transmission means for returning the server determined by the server determination means as the optimum server to the information distribution server having transmitted the inquiry.

Furthermore, according to the present invention, there is provided an information distribution system comprising: dispersed/arranged information distribution servers; and a network status server.

The information distribution server comprises: inquiry means for inquiring of the network status server about the optimum information distribution server among the dispersed/arranged information distribution servers in response to an accessing client; response reception means for receiving a response from the network status server; and indication means for indicating the optimum information distribution server to the accessing client. The network status server comprises: inquiry reception means for receiving the inquiry from the inquiry means; logical distance obtaining means for obtaining respective logical distances between respective sites provided with the dispersed/arranged information distribution servers and the accessed client; collection means for collecting network state information between the respective sites provided with the dispersed/arranged information distribution servers and the accessed client, and state information in the site provided with the dispersed/arranged information distribution servers; server determination means for determining the optimum information distribution server from the dispersed/arranged information distribution servers based on the logical distance obtained by the logical distance obtaining means, the network state information between the respective sites provided with the dispersed/arranged information distribution servers and the accessed client, and the state information in the site provided with the dispersed/arranged information distribution servers collected by the collection means; and response transmission means for returning the server determined by the server determination means as the optimum server to the information distribution server having transmitted the inquiry.

Additionally, according to the present invention, there is provided an information distribution system comprising: dispersed/arranged information distribution servers; and a network status server.

The information distribution server comprises: inquiry means for inquiring of the network status server about the optimum information distribution server among the dispersed/arranged information distribution servers in response to an accessing client; response reception means for receiving a response from the network status server; and indication means for indicating the optimum information distribution server to the accessing client. The network status server comprises: inquiry reception means for receiving the inquiry from the inquiry means; logical distance obtaining means for obtaining respective logical distances between respective sites provided with the dispersed/arranged information distribution servers and the client accessing the information distribution server; collection means for collecting network state information between the respective sites provided with the dispersed/arranged information distribution servers and the accessed client, and state information in the site provided with the dispersed/arranged information distribution servers; site determination means for, when it is judged that the access from the client is a first access, determining the optimum site from the respective sites provided with the dispersed/arranged information distribution servers based on the logical distance obtained by the logical distance obtaining means; first server determination means for determining the optimum information distribution server from the information distribution servers in the optimum site determined by the site determination means based on a predetermined condition; second server determination means for, when it is judged that the access from the client is not the first access, determining the optimum information distribution server from the dispersed/arranged information distribution servers based on the logical distance obtained by the logical distance obtaining means, the information of the network state between the respective sites provided with the dispersed/arranged information distribution servers and the accessed client collected by the collection means, and the state information in the site provided with the dispersed/arranged information distribution servers; and response transmission means for returning the server determined by the first server determination means or the second server determination means as the optimum server to the information distribution server having transmitted the inquiry.

The present invention relates to the server, the system, a control method of controlling the server and system, or a storage medium for storing a control program for controlling the server and system.

Since the present invention is constituted as described above, the access load between the dispersed/arranged web server sites can be leveled.

Moreover, the access between the dispersed/arranged web server sites is leveled, while the access load between the web servers in each web server site can be leveled.

Furthermore, in order to determine the optimum web server at a high speed, the optimum web server site is first determined at a high speed by a first determination method, and the true optimum web server is then determined by a second determination method, so that the optimum web server can be determined at the speed as high as possible.

Additionally, in order to determine the optimum web server at a high speed, the accessed web server can detect the network state and server state at a high speed.

Moreover, the access client can be switched to the optimum web server without requiring any active operation.

Furthermore, when all the dispersed/arranged web servers accept the first access, the concentration of the accesses can be eliminated.

Other features and advantages of the patent invention will be apparent from the following description in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and together with the description, server to explain the principles of the invention.

DETAILED DESCRIPTION OF THE PREFERRED EMBODIMENTS

Figure 1:
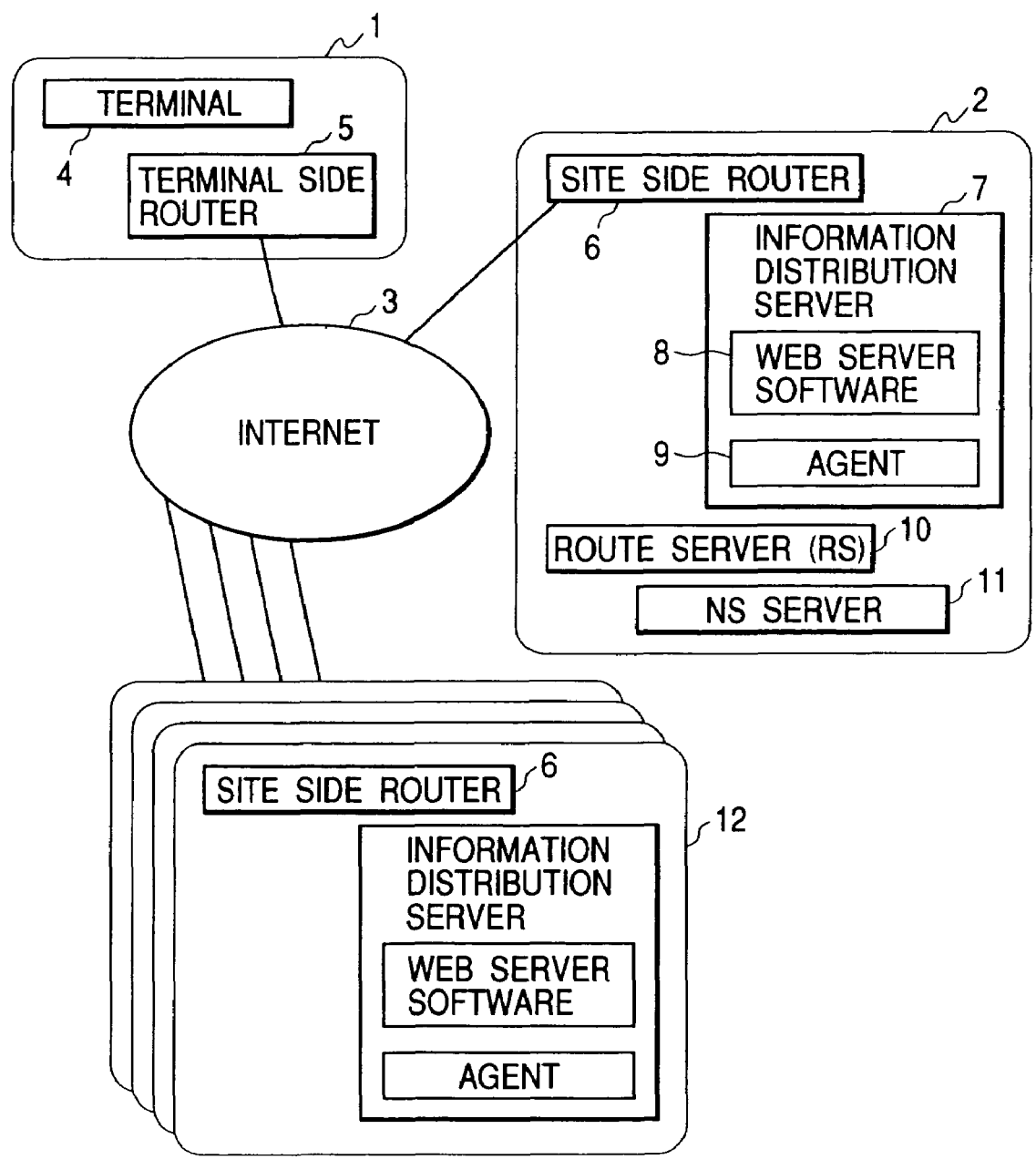
FIG. 1 is an explanatory view of a constitution according to an embodiment of the present invention.

An embodiment of the present invention will be described in detail hereinafter with reference to the drawings. FIG. 1 is a constitution system diagram of an optimum server selection system of the present invention. Shown is an example in which Internet is used as communication means between respective sites. In FIG. 1, a terminal side site 1 accesses an information distributing server, and a server site 2 is provided with an accessed information distributing server (hereinafter referred to as the information distribution server or the web server). Here, the site means the same logical network block, and indicates, for example, the address block of class B or C as a network address class. Of course, even when the block is physically in the same place, it can be regarded as the site. Moreover, in the present embodiment, the server site 2 is dispersed and disposed to perform high-speed large-capacity information distribution. FIG. 1 shows dispersed/arranged server sites 12. Numeral 3 denotes Internet as communication means among the respective sites. In the present embodiment, the communication means among the sites is Internet, but is not limited to this, and for example, a packet communication network, a public network (telephone network), and the like may be used.

A terminal 4 accesses the information distribution server, and is an information processor in which a standard browser accessible to the information distribution server (web server) is installed in the present embodiment. A terminal side router 5 is a router for performing the path control of the inside and outside of an access side site. A site side router 6 is a router for performing the path control of the inside and outside of the site provided with the information distribution server.

In an information distribution server 7, a web server software 8 as a standard information distributing software and an agent software 9 newly prepared in the present invention operate. The web server software 8 is a server software provided with a function of transferring information written in html language in response to a request from the outside. Moreover, the agent software 9 is a software provided with various server operation situations and indications for the web server software 8. Additionally, needless to say, the information distribution server may operate with the software integrally formed by the web server software 8 and agent software 9.

The respective site side routers 6 are provided with the path information obtained when the respective sites view the other sites through Internet (network). A route server 10 is provided with a function of obtaining path information (e.g., BGP information, RIP information, OSPF information, and the like) from the respective site side routers 6. Moreover, the route server 10 has a function of transmitting the path information to a network status server (hereinafter referred to as the NS server) 11.

The NS server 11 instructs the agent 9 to measure various operation states of the site 2 provided with the dispersed/arranged information distribution servers and the information distribution servers in the site 12, and obtains and stores measurement results. Moreover, the agent 9 measures the network states (e.g., congestion degree, router step number, packet loss ratio, response time, and the like) between terminal side site 1 having requested for the information and the respective information distribution servers 2 and 12, and the NS server 11 obtains and stores the network states measured by the agent 9. Furthermore, the NS server 11 obtains the information from the route server 10 to obtain the network distance between the terminal side site 1 having requested for the information and the sites 2 and 12 provided with the respective information distribution servers.

Additionally, in FIG. 1, the route server 10 and NS server 11 are in the site 2, but are not limited in the site 2, and may be in any other site.

Figure 2:
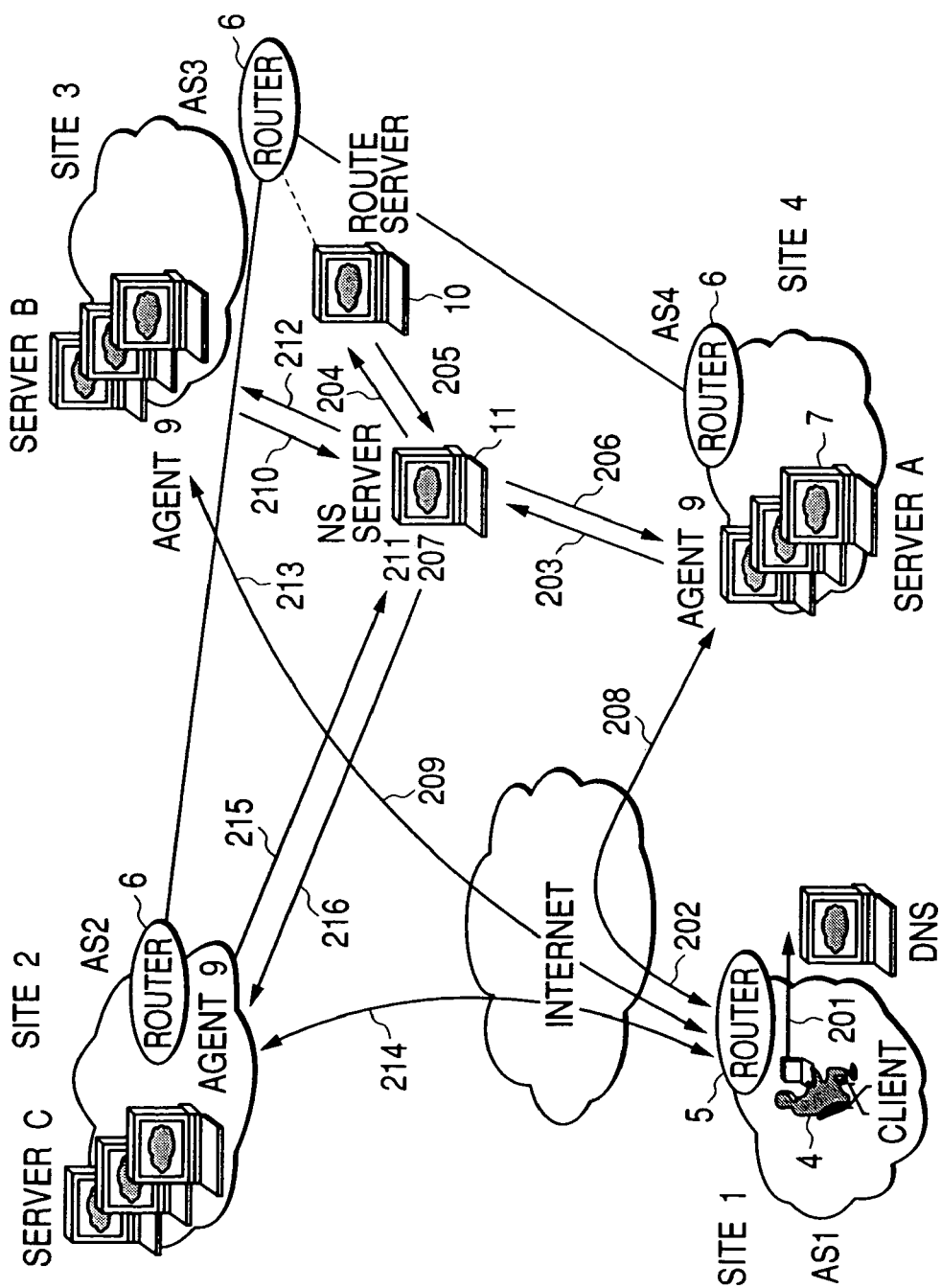
FIG. 2 is an explanatory view of a function and operation according to the embodiment of the present invention.

An operation for controlling the access to the optimum web server in the present embodiment will next be described. First, FIG. 2 is a schematic view of the web server access. Here, an operation performed when the terminal 4 of the site 1 accesses the web server is concretely shown. Shown is a case in which the terminal 4 in the autonomous (AS) system 1 accesses the web server provided with the access address (hereinafter referred to as URL) of the web site of www.abcde.jp. First, in order to obtain the IP address of the target web server, a nearest domain name server (DNS) in its network (site 1) is inquired from the URL, and the corresponding IP address (addr1) is received (201). Subsequently, the desired web site (the web site having the URL of www.abcde.jp) is accessed (=requested) by the IP address (addr1) (202). When the web server A having the IP address (addr1) accepts the access, the agent 9 inquires of the network status server (NS server) whether or not the web server is an optimum server for the accessed client (203). The NS server inquires of the route server 10 about the network distance between the respective sites 2, 3, 4 provided with the dispersed/arranged web servers and the accessed client site 1 (204). Since the route server 10 exchanges the path information with the border gateway router 6 in each site, the distance between each site and the client site 1 can quickly be returned (205). The NS server 11 receives the response from the route server 10, determines the site 3 as the closest site in the network, and returns the URL of the optimum web server B to the agent 9 of the site 4 (206). Alternatively, the IP address (addr2) of the optimum web server may be returned. In the present embodiment, the AS path information of the border gateway protocol (BGP) is used as a site selection method at this time (when the client first accesses the site) so that the information can quickly be obtained. For this the site 3 is selected as the site with a short AS path from each web server to the client site, and a predetermined method is used to select the web server B having addr2 in the site 3 as the optimum web server.

Additionally, in addition to the path information, the NS server operates to obtain number of routers between each site and the client (router hop number), response time, network information such as a packet loss ratio, network information in each site (congestion degree, number of packets, number of packet errors, and the like), server load situation (CPU load ratio, CPU idle ratio, number of connection links, disk load ratio, and the like), and other information. The NS server prepares for the next inquiry and stores the information (including temporary storage) (207).

The agent 9 in the web server A instructs the client 4 to access the web server B during the next access (208). For example, the web server to be connected to the client can automatically be changed using the location command of the HTML language. As a result, the client 4 will automatically access the optimum web server B from the next access.

An operation performed when the client 4 continuously accesses the web server B will next be described similarly with reference to FIG. 2. The web server B is accessed through the above-described process (209). When the web server B accepts the access, the agent 9 inquires of the NS server 11 whether or not the web server itself is an optimum server for the accessed client (210). The NS server 11 collects the path information and integrates various state information similarly as the operation during the above-described first access and determines the optimum server site and optimum web server. In addition to the path information obtained and stored by the previous access, the NS server 11 obtains number of routers between each site and the client (number of router hops), response time, network information such as the packet loss ratio, network information in each site (congestion degree, number of packets, number of packet errors, and the like), and server state information (CPU load ratio, CPU idle ratio, number of connection links, disk load ratio, and the like) which could not be inspected during the previous access, and the optimum web server to be accessed by the client is calculated and determined from the obtained various information. At this time the selection method comprises applying a numeric weight to each information in accordance with the content, and comparing the total weight for each site or each server to determine the optimum web server C (211). As a result, the client 4 will automatically access the optimum web server C from the next access (214).

Furthermore, when the client 4 successively accesses the web server C, the operation similar to the above-described operation of accessing the web server B is performed (215, 216), but the operation of accessing the NS server is performed after a predetermined time. Subsequently, when a new optimum web server is determined by the obtained and stored various network state information and server state information in the predetermined time, the client 4 changes the access to the new web server.

Figure 3A:
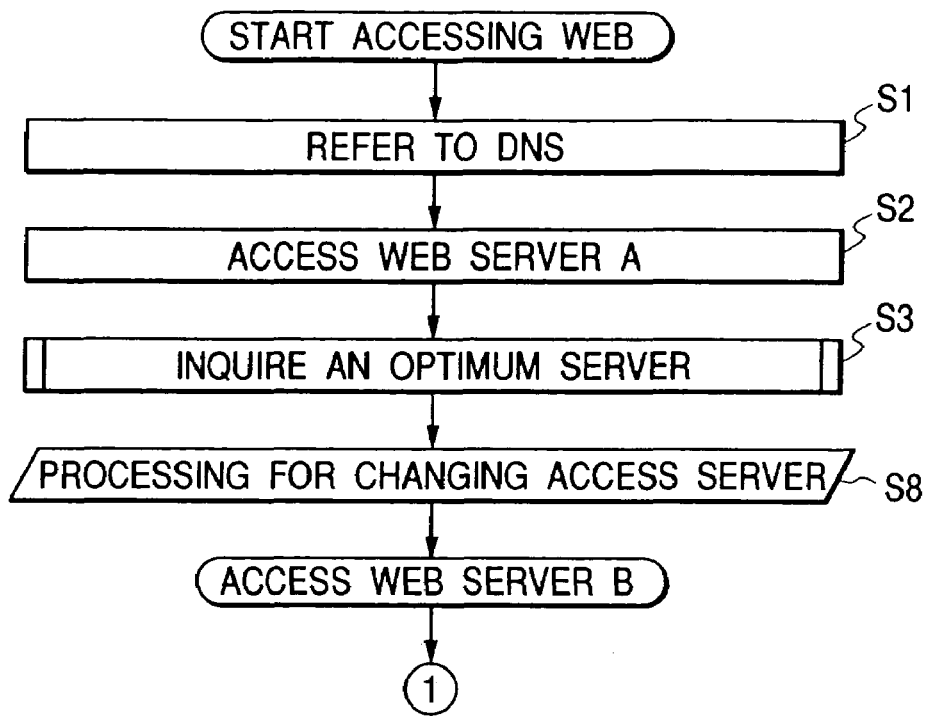
FIGS. 3A, 3B, 3C, 3D and 3E are flowcharts showing the function and operation according to the embodiment of the present invention.
Figure 3B:
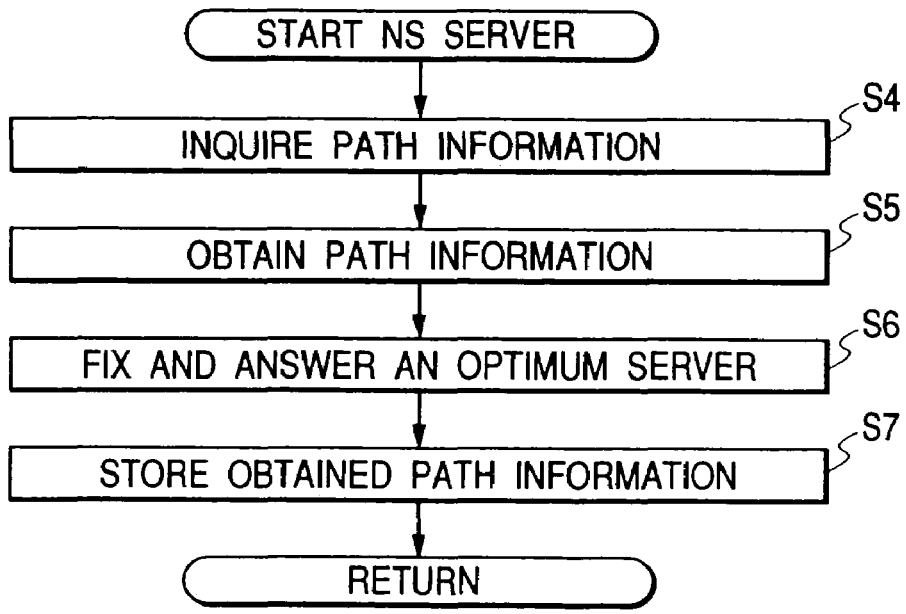
Figure 3C:
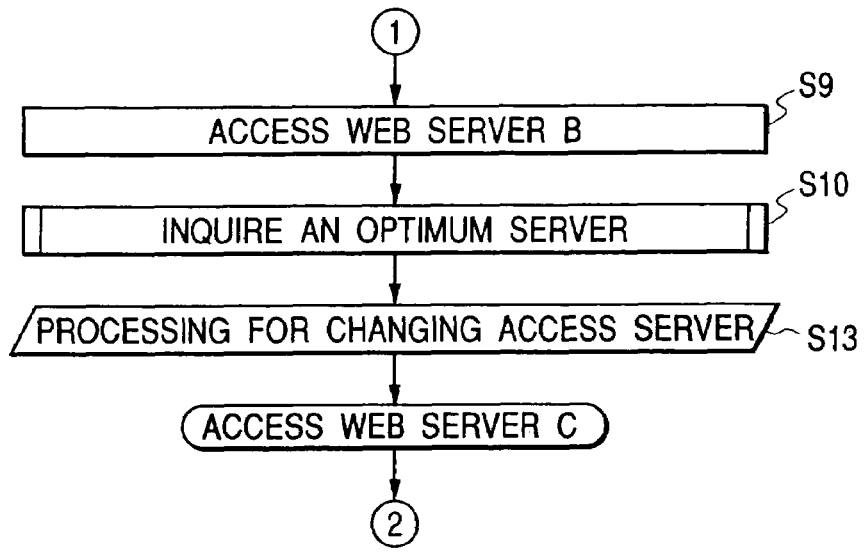
Figure 3D:
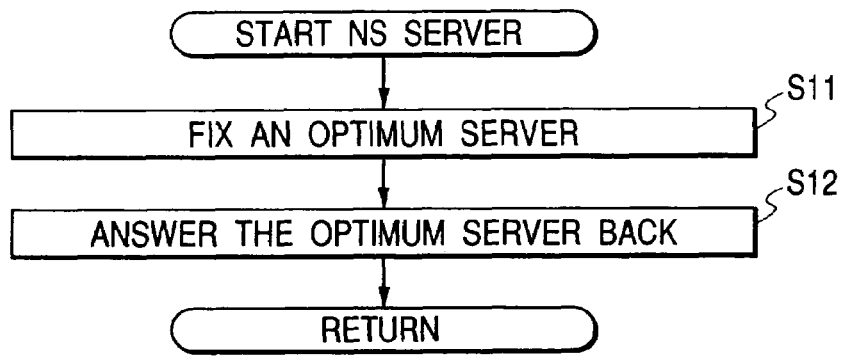
Figure 3E:
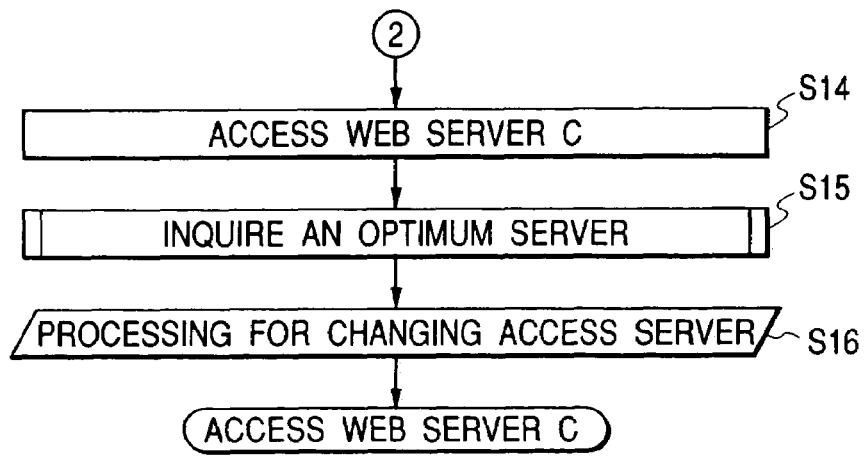

An operation of controlling the access to the optimum web server of the present embodiment will next be described with reference to FIGS. 3A to 3E. FIG. 3A is a flowchart showing an operation performed from when the access client first accesses the web server A until the access is changed to the first optimum web server B. FIG. 3B is a flowchart showing the operation of the NS server. FIG. 3C is a flowchart showing an operation performed from when the access client next accesses the web server B until the access is changed to the optimum access web server C. FIG. 3D is a flowchart showing the operation of the NS server. FIG. 3E is a flowchart showing an operation performed from when the access client accesses the web server C and further inspects the optimum access web server until the web server C is again accessed.

The operation will first be described with reference to FIGS. 3A, 3B. In order to obtain the IP address of the target web server from the URL, the closest domain name server (hereinafter abbreviated as DNS) in its network (site 1) is inquired, and the corresponding IP address (addr1) is received (S1).

Subsequently, the desired web site A is accessed by the IP address (addr1) (S2).

When the web server A accepts the access, the agent 9 inquires of the NS server whether or not the web server is an optimum server for the accessed client (S3).

In the NS server, the network distance from the dispersed/arranged respective web server sites to the accessed client site 1 is inquired of the route server 10 (S4).

Since the route server 10 exchanges the path information with the site side router 6 in each site (hereinafter referred to as the border gateway router), the distance from each site to the client site 1 can quickly be returned, and the NS server obtains the path information and distance (S5).

The NS server 11 receives the response from the route server 10, fixes the site 3 as the close site in the network, determines the optimum web server B in the site 3 in a predetermined method, and answers the agent 9 of the site 4 that the optimum web server is the web server B (S6). Additionally, the predetermined method of fixing the optimum web server in S6 may comprise predetermining the web server for each site, determining the web server in a predetermined order for each site, or arbitrarily determining the web server in the site. Moreover, since the NS server obtains the state information in the site provided with the web server (e.g., the information of the network state in the site such as the congestion degree, number of packets and packet errors, and the server state information such as CPU load ratio, CPU idle ratio, number of connection links and disk load ratios), the optimum web server may be determined utilizing the state information in the site.

The NS server stores the obtained path information (including the temporary storage) to prepare for the next inquiry (S7).

On the other hand, the agent 9 in the web server A answers the client 4 that the optimum web server B is accessed from the next access (S8).

As a result, the client 4 will automatically access the optimum web server B from the next access.

The operation will next be described with reference to FIGS. 3C, 3D.

The web server B is accessed through the above-described process (S9).

When the web server B accepts the access, the agent 9 inquires of the NS server 11 whether or not the web server is an optimum server for the accessed client (S10).

The NS server 11 collects the path information and integrates various state information similarly as the operation during the above-described first access and determines the optimum server site and optimum web server. In addition to the path information obtained and stored by the previous access, the NS server 11 obtains number of routers between each site and the client (router hop number), response time, network information such as the packet loss ratio, network information in each site (congestion degree, number of packets, packet error, and the like), and web server state information (CPU load ratio, CPU idle ratio, number of connection links, disk load ratio, and the like) which could not be inspected during the previous access, and the optimum web server to be accessed by the client is calculated and determined from the obtained various information. At this time the selection method comprises applying the numeric weight to each information in accordance with the content, and comparing the total weight for each site or each server to determine the optimum web server C (S11).

The NS server 11 notifies the agent 9 in the web server B of the optimum web server C (S12), and further answers the client 4 that the optimum web server C is accessed from the next access (S13).

As a result, the client 4 will automatically access the optimum web server C from the next access (S14).

Finally, the operation will be described with reference to FIG. 3E. When the client 4 successively accesses the web server C, the optimum web server is inquired of the NS server similarly as the above-described access to the web server B (S15), but here the web server C is judged to be the optimum web server similarly as the previous access, and the processing for changing the web server to be accessed (S16) is not performed. However, when it is answered in S15 that the web server different from the web server C is the optimum web server, needless to say the processing for changing the web server to be accessed is performed.

Additionally, the operation of accessing the NS server is intermittently performed after a predetermined time. Subsequently, when a new optimum web server is determined by the obtained and stored various network state information and server state information in the predetermined time, the client 4 changes the access to the new web server.

An operation will next be described with reference to FIG. 4, in which the NS server 11 obtains and stores the state of the network from the web server to the client, the state of the network in the web server site, and information on the web server state.

In the present system, the following two categories of information are periodically (intermittently) collected:

(1) Network state from each server site to the client;

(2) State in each server site (network state, server state).

Figure 4:
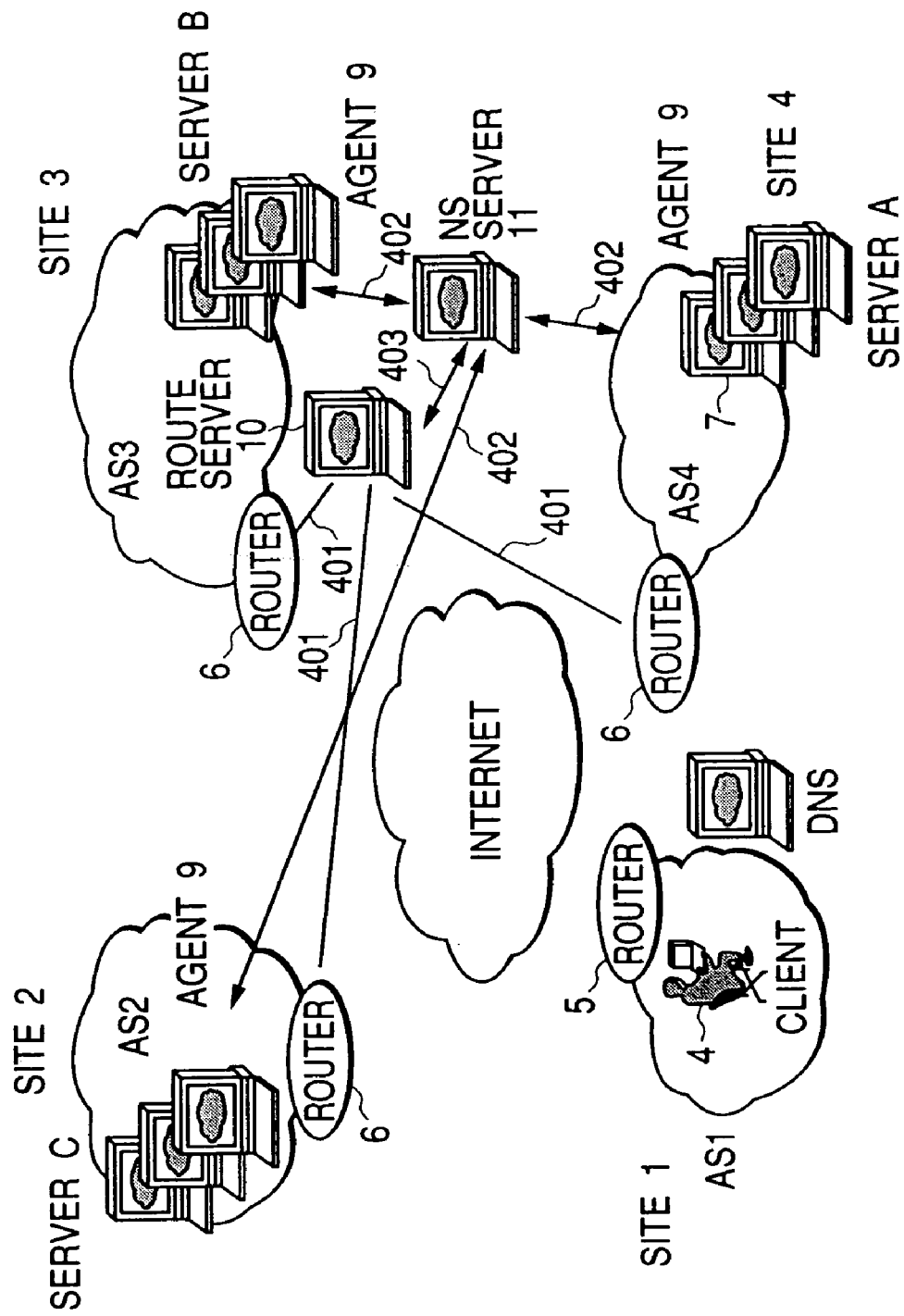
FIG. 4 is an explanatory view showing the function and operation of an NS server according to the embodiment of the present invention.

FIG. 4 shows a relation. The NS server 11 periodically measures the network state from each server site to the accessed client. Items to be measured are described later.

Each server site router 6 holds the network path information seen from the server site, and the route server 10 collects the path information owned by the router from each server site router 6. The route server 10 has a logical connection as being peer-to-peer with each server site router 6, that is, the border gateway router (BGR) or an external network border router (401). Subsequently, the analysis result of the predetermined path information is obtained in response to the request from the NS server 11, and returned to the NS server 11 (402). For other inspection items, the NS server autonomously performs the inspection (403), but in some cases the NS server 11 instructs the agent software 9 incorporated in each web server software to perform inspection in accordance with the inspection content.

For the network and server states in each server site, the agent software 9 incorporated in the web server software of each server site periodically performs the inspection in accordance with the instruction from the NS server 11. The collected various information are stored in the NS server in time series. In this data storage method, time is intermittently stored as information attached to the various information. In the present embodiment, various information are inspected, obtained, and stored every 30 minutes. Moreover, it is empirically known that the stored information periodically changes in predetermined periods such as a day unit, week unit, month unit, and year unit. Therefore, in the present system, the stored information is approximated with a predetermined function.

Figure 8:
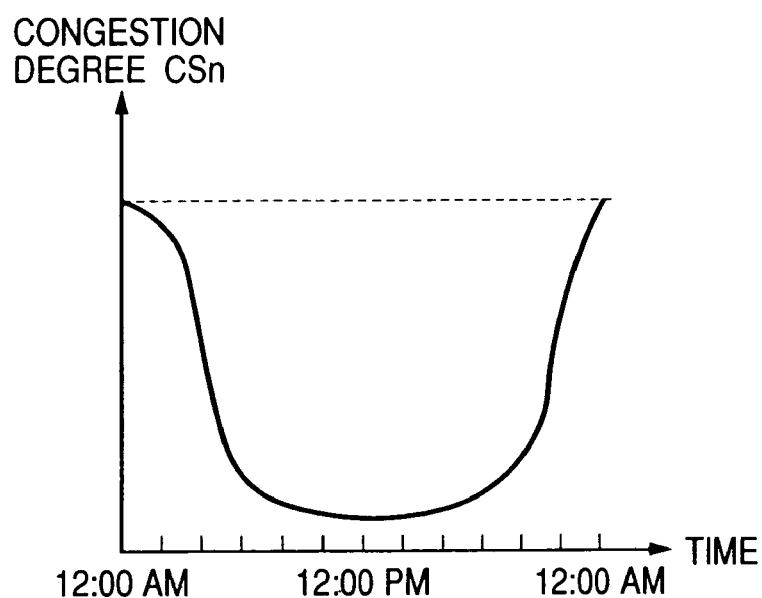
FIG. 8 is a diagram showing an approximation curve during approximation of collected information with a predetermined function.

The time unit for the approximation may be any one of the day unit, week unit, month unit, and year unit, but in the present embodiment, various information are approximated by the day unit by a three-dimensional function and a coefficient is saved. For example, when the congestion degree (CSn) of the network in the server site is approximated with the three-dimensional function, a time axis is set to t, and the approximation is performed with an approximation curve shown in FIG. 8. When the approximation equation is represented as $CSn = a \cdot t^3 + b \cdot t^2 + c \cdot t + d$ (a, b, c, d being coefficients), the NS server saves this coefficient (the three-dimensional function itself may be saved).

As a result, when the request for selecting the optimum server is received from each server, by utilizing the three-dimensional function, various states are momentarily estimated, and the optimum server is selected based on the estimated value.

The collection of the network state information between each server site and the access client is not infinitely continued, and is continued while the access to the dispersed/arranged servers is continued and for a predetermined period after that. In the present embodiment, the period is set to one week. When there is no access from the access client 4 for one week, the information collecting operation to the access client 4 from each site is not performed.

Moreover, when there is no access from the access client 4 for the predetermined period (e.g., three weeks), the network state information (the approximation equation, and the like) between the access client 4 and each server site stored in the NS server stored in the NS server may be discarded. In this case, no wasteful information is stored, and the storage capacity necessary for the NS server can advantageously be saved.

Furthermore, when there is no access from the access client 4 for the predetermined period, the path information between the access client 4 and each server site stored in the NS server may also be discarded.

Additionally, the stored information can also be treated as the result representative of a specific area. Specifically, the NS server obtains and stores the path information (logical distance) between each server site and the access client or the network state information between each server site and the access client. For the path information (logical distance) between each server site and the access client, the path information (logical distance) between each server site and the site to which the access client belongs may be utilized. For the network state information between each server site and the access client, the network state information between each server site and the access client may be utilized.

For example, when the IP address of the access client 4 is 192.168.0.1, the network state with this client is used as the result of the entire class C address block. Specifically, for the access from the network block of 192.168.0.0/24, the already inspected and obtained information of 192.168.0.1 is used. In this case, the memory space for the data to be stored can be reduced. In the present embodiment, the access client area is classified with the class B access (the network address block corresponding to A.B.0.0/16).

The network and information distribution server state information autonomously inspected and obtained by the NS server 11 will next be described.

(1) The network state information from each information distribution server site to the client are as follows:
ASLn: distance between the logical networks by AS path (BGP path information is used);
RTn: response time;
RNn: number of router steps (number of router hops); and
PLn: packet loss ratio.

(2) The state (network, server) information in each information distribution server site are as follows:
as the network state information in the site,
CSn: congestion degree in the site;
PSn: number of packets in the site; and
ESn: packet error,
as the information distribution server state information,
CPUnm: CPU load ratio;
IDLEnm: CPU idle value;
LINKnm: number of connection links; and
IOnm: disk load ratio, additionally, n: server site number, m: server number.

A method of using these network and server state information to determine the optimum server. The NS server 11 stores these various state information, and uses these information to determine the optimum server site and server. In the present embodiment, these are calculated using the following equation.

A selection method I corresponds to the selection method in the step S6 in FIG. 3B, and the site in which ASLn is minimum is fixed as the optimum site.

A selection method II corresponds to the selection method in the step S11 in FIG. 3D.

A network state value $K1n$ between the server site and the client, a network state value $K2n$ in the server site, and a server state value are obtained, and an optimum site judgment value Kn is obtained for each server site as shown by the following equation. The site number (n) in which the value is minimum is fixed as the optimum site. Subsequently, an optimum server judgment value Snm is obtained using $K3nm$. The optimum server judgment value is obtained from the optimum site judgment value and server state value. Therefore, by using the network state of the client site and server site, network state in the site, server state, and logical distance between the networks with weight coefficients A to O, the optimum server is generally judged. Additionally, here, the server in which Snm is minimum is fixed as the optimum server.

Network state value: $K1n = RTn \cdot A + RNn \cdot B + PLn \cdot C$

In-site network state value: $K2n = Csn \cdot D + PSn \cdot E + ESn \cdot F$

Server state value:

$$K3nm = CPUnm \cdot G + IDLEnm \cdot H + LINKnm \cdot I + IOnm \cdot J$$

Optimum site judgment value: $Kn = K1n \cdot K + K2n \cdot L + ASLn \cdot M$

Optimum server judgment value: $Snm = Kn \cdot N + K3nm \cdot O$

Additionally, n: number of server sites, m: number of servers, A to O: weight coefficients.

Moreover, in the present embodiment, the response time, number of router steps (number of router hops), and packet loss ratio are used as the network state value, the congestion degree in the site, number of packets in the site, and packet error are used as the in-site network state value, and CPU load ratio, CPU idle value, number of connection links, and disk load ratio are used as the server state value, but with respect to the network state value, in-site network state value and server state value, at least one of the utilized information in the present embodiment may be utilized.

Moreover, the network state information in the site and the state information of the information distribution server are utilized as the state information in the server site, but either one may be used as the representative during the determination of the optimum server.

The function of the route server used in the present system will next be described with reference to FIG. 5. The current Internet/Intranet is said to be an environment in which routers are connected in a mesh manner. In the system, in order to distribute the desired packet to a specific place, a routing protocol is used, and the routing protocol called Border Gateway Protocol (BGP) is used in a wide network. In the BGP, each router is provided with a path table, and the packet is distributed to the specific place based on this path table.

Figure 5:
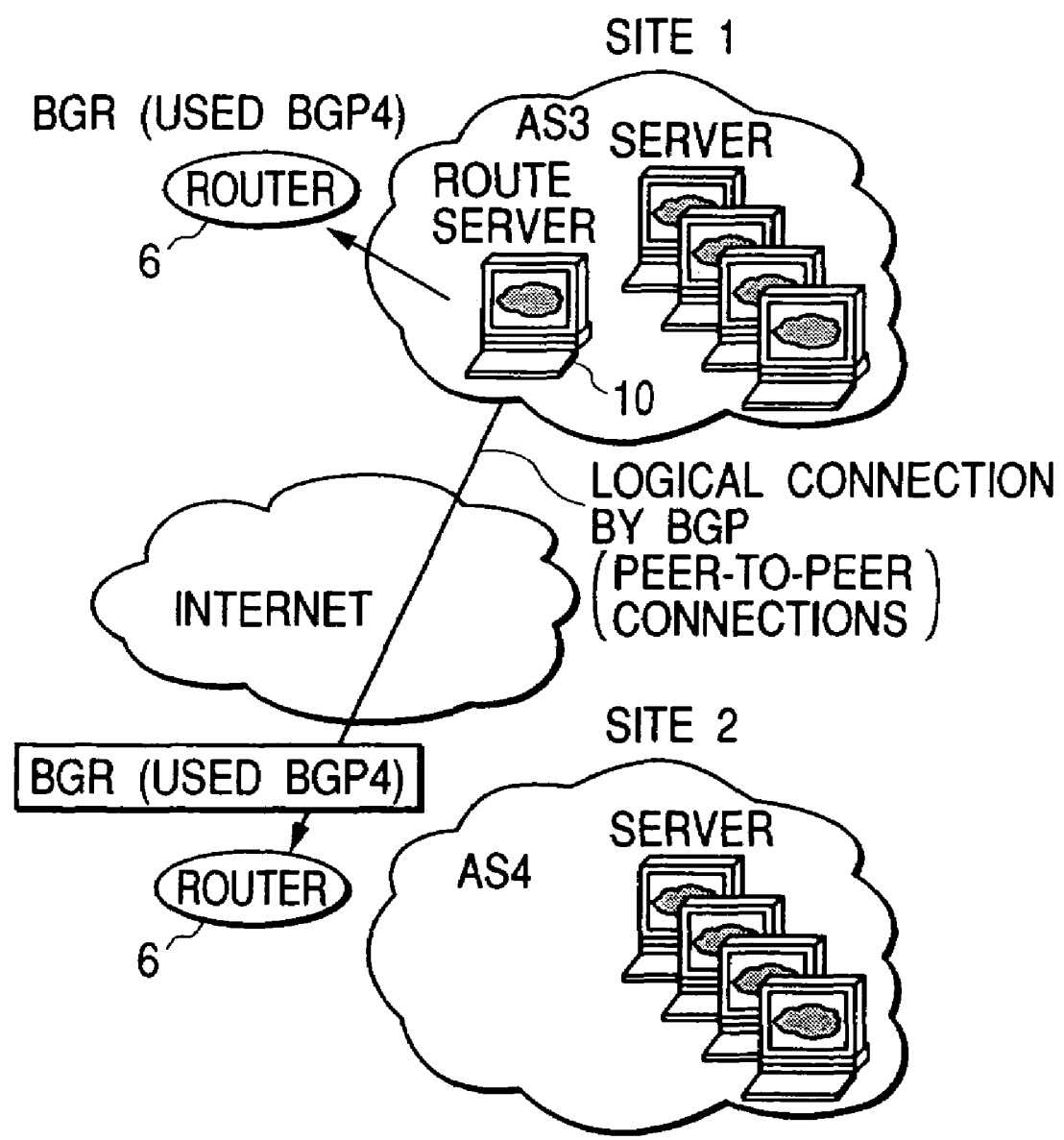
FIG. 5 is an explanatory view showing the function and role according to the embodiment of the present invention.
Figure 6:
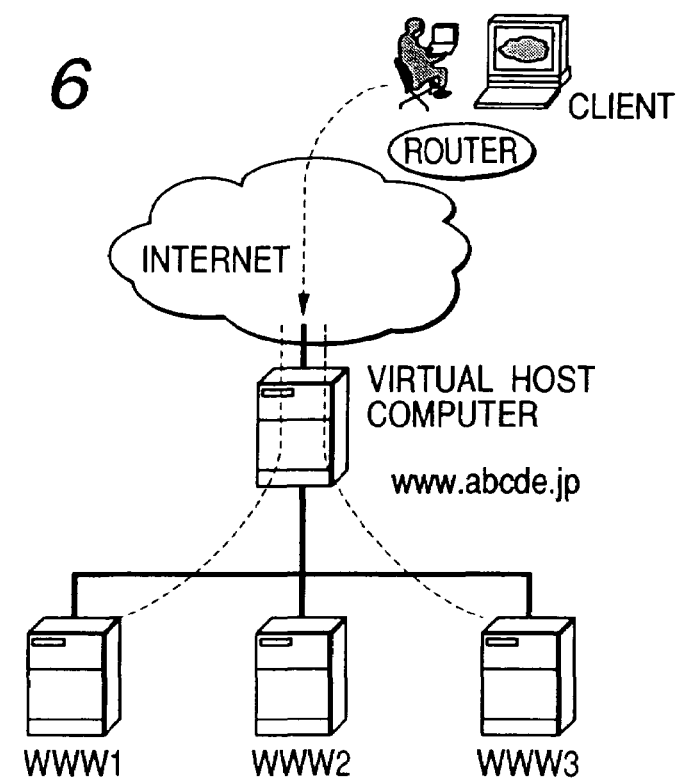
FIG. 6 is an explanatory view of a conventional virtual host computer system.
Figure 7:
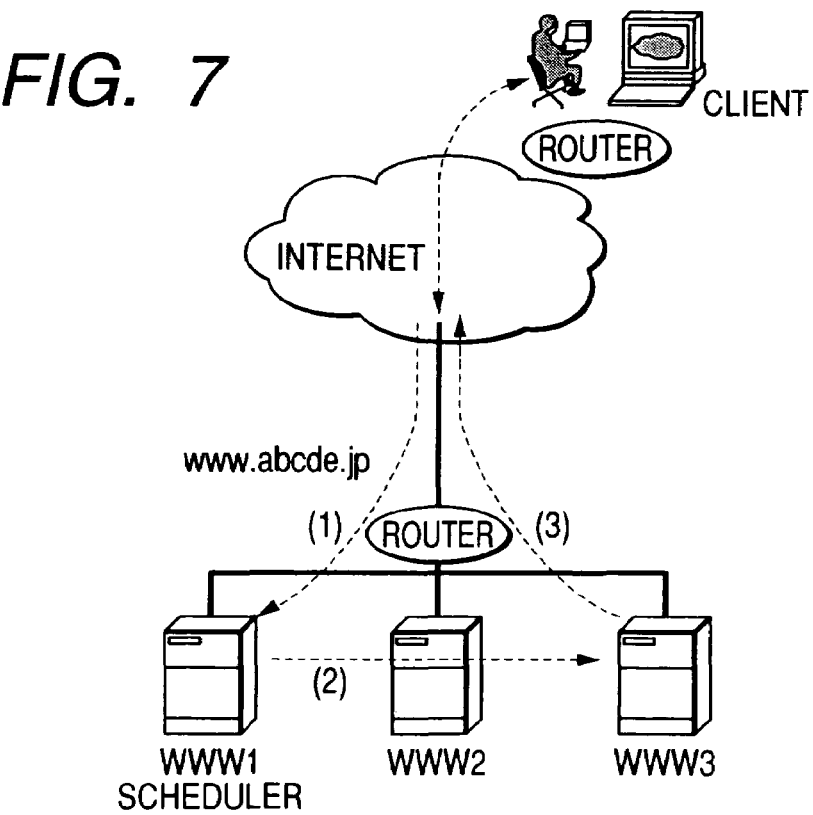
FIG. 7 is an explanatory view of a conventional TCP connection hop system.

In FIG. 5, the route server 10, each site router and BGP are logically connected as being peer-to-peer. Here, as one technique of measuring the distance between each site and the client, AS-path number is utilized. This AS-path number means the number of independent networks treated in the BGP, and the path information up to the desired AS number are mapped as the connection of AS numbers in the path information. Specifically, the path information between the server site and the client site can be known as the connection of AS numbers applied to the independent networks. The AS-path number indicates the frequency at which the independent networks are passed, and can be known from the connection of the AS numbers.

The route server can collect the path information viewed from each server site by obtaining the path information from the router 6 in each server site, and the server site closest to the access client (in the AS path) can be selected.

In the present embodiment, this route server is used to obtain the BGP distance between the access client and each server site, that is, the AS-path number, and the distance is used as one of the selection conditions for determining the optimum server site.

Moreover, in the present embodiment, used are the selection method I of obtaining the optimum site from the logical distance from the server site to the client and then determining the information distribution server in the optimum site in the predetermined method, and the selection method II of determining the optimum information distribution server from the logical distance, network state information and information distribution server state information. For the first access from the client, the selection method I is used to determine the optimum server, and for the second and subsequent accesses, the selection method II is used to determine the optimum server, but the present invention is not limited to this order, and the selection method I may constantly be used, or the selection method II may be used.

Moreover, when the client accesses the NS server, and the path information (logical distance) between the client and the server site is stored, the stored path information may be utilized to determine the optimum server.

Figure 9:
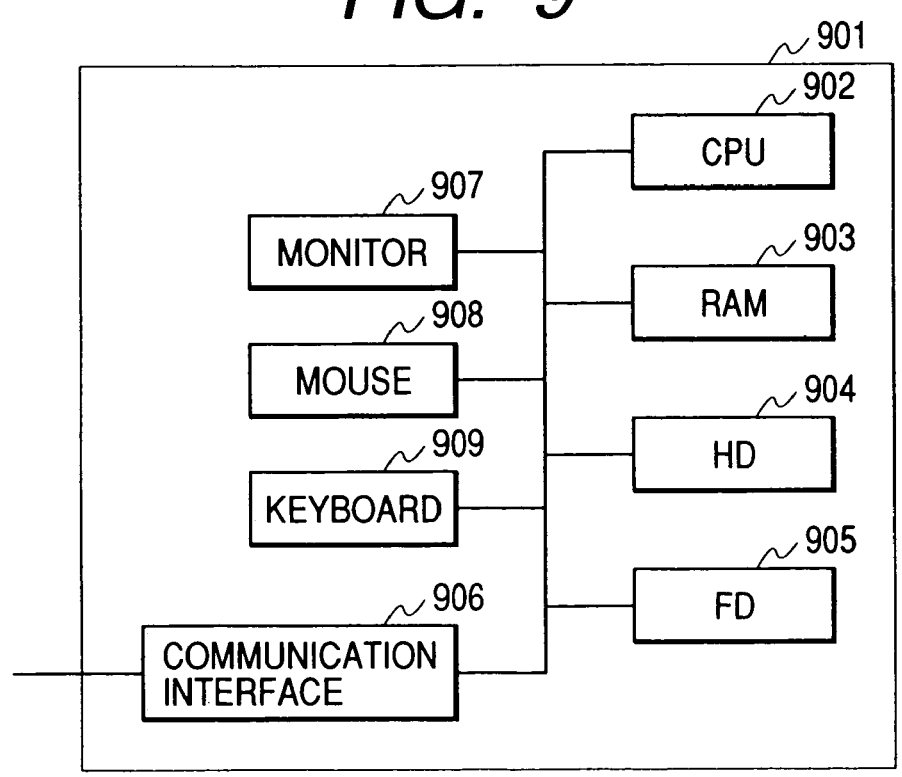
FIG. 9 is a block diagram of a computer which can be realized by an NS server, information distribution server and route server of the present invention.
Figure 10:
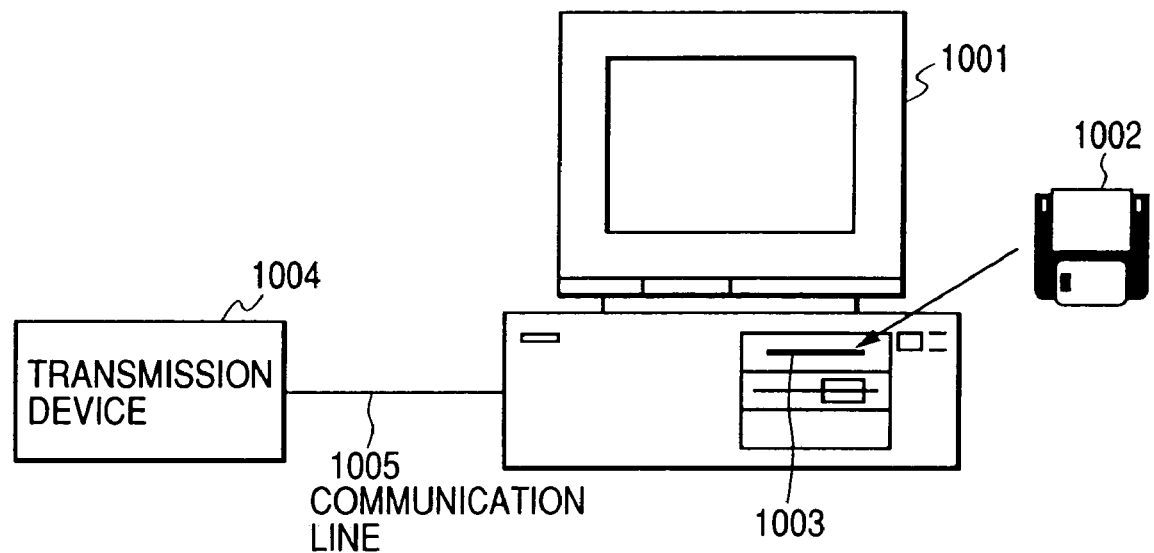
FIG. 10 is a schematic view showing a storage medium for storing a program code and a transmission device for transmitting the program code.

Furthermore, the NS server, information distribution server and route server of the present invention can be realized by the information processor with a constitution equal to that of the computer shown in FIG. 9. A computer 901 of FIG. 9 is constituted of a CPU 902 for reading a program to perform an actual processing, RAM 903 used by the CPU 902 during the processing, hard disk (hereinafter referred to as HD) 904 as the storage medium for supplying a program code, floppy disk (FD) 905, communication interface 906 used during connection to the network, and the like. The network status server control program and information distribution system control program of the present invention may be performed by the computer with the constitution equal to that of FIG. 9 by the program installed from the outside. In this case, as shown in FIG. 10, needless to say, the object of the present invention is achieved by providing the system or the device with a recording medium 1002 in which the software program code for realizing the function of the above-described embodiment is recorded, and reading and executing the program code stored in the storage medium by the computer (or CPU or MPU) of the system or the device.

In this case, the program code itself read from the storage medium realizes the inventive function of the present invention, and the storage medium for storing the program code constitutes the present invention.

As the storage medium for supplying the program code, for example, magnetic disks such as a floppy disk and hard disk, optical disks, optical magnetic disks, CD-ROM, CD-R, DVD-ROM, DVD-RAM, magnetic tapes, memory cards, ROM, and the like can be used.

Moreover, it goes without saying that the present invention can be applied to a case in which the program is distributed from the storage medium for recording the program code of the software for realizing the function of the above-described embodiment via the communication line of the personal computer communication, and the like.

Figure 11:
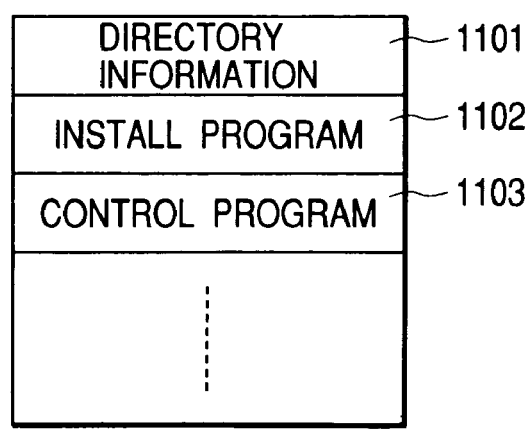
FIG. 11 is an image diagram showing the memory map of the storage medium for storing a network status server control program or an information distribution system control program in the present invention.

FIG. 11 is a diagram showing one example of the memory map of storage media such as the CD-ROM for supplying the program code. An area 1101 for storing directory information indicates the positions of an area 1102 for storing an install program, and an area 1103 for storing control programs such as a network status server control program and an information distribution system control program. When the network status server control program or the information distribution system control program of the present invention is installed in the computer, the install program stored in the area 1102 is loaded to the system, and executed by the CPU. Subsequently, the install program executed by the CPU reads the network status server control program or the information distribution system control program from the area 1103 for storing the control programs such as the network status server control program and information distribution system control program and stores the program in the hard disk.

When the present invention is applied to the storage medium, the storage medium stores the program code corresponding to the flowchart described above.

Moreover, it goes without saying that, as shown in FIG. 10, the object of the present invention is achieved by transmitting the program code of the software for realizing various functions in the above-described embodiment from a transmission device 1004, for example HTTP server or FTP server, receiving the code via a network 1005, public line or radio, and executing the program code by the computer (or CPU, MPU) of the system or device.

In this case, since the program code itself transmitted from the transmission device realizes the function in the above-described embodiment, the transmission device for transmitting the program code constitutes the present invention.

Moreover, the present invention can be applied not only to the realization of the function of the above-described embodiment by executing the program code read by the computer but also to the realization of the function of the above-described embodiment by performing a part or the whole of the actual processing by the OS, and the like operating on the computer based on the instruction of the program code.

As described above, according to the present embodiment, there is an effect that the access load between the dispersed/arranged web server sites can be leveled.

Moreover, the access between the dispersed/arranged web server sites is leveled, and the access load can effectively be leveled even between the web servers in each web server site.

Furthermore, in order to determine the optimum web server at a high speed, when the client has a first access, the optimum web server site is determined using the path information (logical distance) at a high speed in the first determination method. In the subsequent access from the client, the optimum web server can be determined at a high speed by using not only the path information but also the network state information and the state information in the web server site in the second determination method to determine the optimum web server, which produces an effect that the web server can respond to the access client at a high speed.

Additionally, since the network state information and server state information necessary for recognizing the optimum web server are automatically obtained and stored in the NS server, or the NS server obtains and stores the information, and the optimum web server is generally determined by the information, there is an effect that the accessed web server can determine the optimum web server at a high speed.

Moreover, the client is switched to the optimum web server without adding the separate device or requiring any active operation, and all the web servers in the dispersed/arranged web server sites can accept the access, the concentration of the accesses can effectively be eliminated.

What is claimed is:

1. A server determination apparatus, comprising:
    first receiving means for receiving a first inquiry from a first one of a plurality of information distribution servers as to which one of the plurality of information distribution servers a client should access based on a first access request received by the first one of the plurality of information distribution servers from the client;
    collection means for collecting, from the plurality of information distribution servers, network state information between the client and each of the plurality of information distribution servers;
    first server determination means for determining, based on a logical distance between the client and each of the plurality of information distribution servers, which one of the plurality of information distribution servers should be accessed by the client which submitted the first access request to the first one of the plurality of the information distribution servers;
    first informing means for informing the first information distribution server of the one of the plurality of information distribution servers that the client should access determined by the first server determination means;
    second receiving means for receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first one of the information distribution servers information indicating the determined one of the plurality of information distribution servers informed by the first informing means;
    second server determination means for determining, based on network state information collected by said collecting means between the time that the first inquiry is received by the first receiving means and the time that the second inquiry is received by the second receiving means, which one of the plurality of information distribution servers should be accessed by the client; and
    second informing means for informing the one of the plurality of information distribution servers that submitted the inquiry received by the second receiving means which one of the plurality of information distribution servers that the client should access determined by the second server determination means.

2. The apparatus according to claim 1, wherein said collection means collects, as the network state information, at least one of a response time, a number of router steps, and a packet loss ratio between said client and each of the plurality of information distribution servers.

3. The apparatus according to claim 1, wherein said collection means collects at least one of a congestion degree, a number of packets, and a number of packet errors.

4. The apparatus according to claim 1, wherein as the network state information, said collection means collects at least one of a CPU load ratio, a CPU idle value, a number of connection links, and a disk load ratio of each of the plurality of information distribution servers.

5. The apparatus according to claim 1, wherein each of the plurality of information distribution servers includes the first information distribution server.

6. A server determination apparatus, comprising:
    first receiving means for receiving a first inquiry from a first information distribution server, wherein the first inquiry is submitted by the first information distribution server based on a first access request received by the first information distribution server from a client;
    collection means for collecting, from each of a plurality of information distribution servers, state information of each of the plurality of information distribution servers;
    first server determination means for determining, based on a logical distance between the client and each of the plurality of information distribution servers, which one of the plurality of information distribution servers should be accessed by the client which submitted the first access request to the first information distribution server;
    first informing means for informing the first information distribution server of the one of the plurality of information distribution servers that the client should access determined by the first server determination means;
    second receiving means for receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first information distribution server information indicating the determined one of the plurality of information distribution servers informed by the first informing means;
    second server determination means for determining, based on state information of each of the information distribution servers collected by said collecting means between the time that the first inquiry is received by the first receiving means and the time that the second inquiry is received by the second receiving means, which one of the plurality of information distribution servers should be accessed by the client; and
    second informing means for informing the one of the plurality of information distribution servers that submitted the second inquiry received by the second receiving means which one of the plurality of information distribution servers that the client should access determined by the second server determination means.

7. The apparatus according to claim 6, wherein said first and second server determination means determines one of a plurality of sites provided with the plurality of information distribution servers, and determines the one of the plurality of information distribution servers in the determined one of the plurality of sites.

8. The apparatus according to claim 6, wherein said collection means collects as the state information at least one information of a response time, a number of router steps, and a packet loss ratio between said client and each of said plurality of information distribution servers.

9. The apparatus according to claim 6, wherein said state information comprises network state information in a plurality of sites provided with the plurality of information distribution servers.

10. The apparatus according to claim 6, wherein said collection means collects as the state information at least one information of a congestion degree, a number of packets, and a number of packet errors in a plurality of sites provided the plurality of information distribution servers.

11. The apparatus according to claim 6, said collection means collects as the state information at least one information of a CPU load ratio, a CPU idle value, a number of connection links, and a disk load ratio of each of the plurality of information distribution servers.

12. The apparatus according to claim 6, wherein each of the plurality of information distribution servers includes the first information distribution server.

13. A server determining method executed by a server determining apparatus, the method comprising:
  a first receiving step of the server determining apparatus receiving a first inquiry from a first one of a plurality of information distribution servers as to which one of the plurality of information distribution servers a client should access based on a first access request received by the first one of the plurality of information distribution servers from the client;
  a collecting step of the server determining apparatus collecting, from the plurality of information distribution servers, network state information between the client and each of the plurality of information distribution servers;
  a first server determining step of the server determining apparatus determining, based on a logical distance between the client and each of the plurality of information distribution servers, which one of the plurality of information distribution servers should be accessed by the client which submitted the first access request to the first one of the plurality of the information distribution servers;
  a first informing step of the server determining apparatus informing the first information distribution server of the one of the plurality of information distribution servers that the client should access determined by the first determining step;
  a second receiving step of the server determining apparatus receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first one of the information distribution servers information indicating the determined one of the plurality of information distribution servers informed by the first informing step;
  a second server determining step of the server determining apparatus determining, based on network state information collected by said collecting step between the time that the first inquiry is received by the first receiving step and the time that the second inquiry is received by the second receiving step, which one of the plurality of information distribution servers should be accessed by the client; and
  a second informing step of the server determining apparatus informing the one of the plurality of information distribution servers that submitted the inquiry received by the second receiving step which one of the plurality of information distribution servers that the client should access determined by the second server determining step.

14. The method according to claim 13, wherein said collecting step comprises collecting at least one of a response time, a number of router steps, and a packet loss ratio between said client and each of the plurality of information distribution servers.

15. The method according to claim 13, wherein, as the network state information, said collecting step comprises collecting at least one of a congestion degree, a number of packets, and a number of packet errors.

16. The method according to claim 13, wherein said collecting step comprises collecting at least one of a CPU load ratio, a CPU idle value, number of connection links, and a disk load ratio of each of the plurality of information distribution servers.

17. The method according to claim 13, wherein each of the plurality of information distribution servers includes the first information distribution server.

18. A server determination method executed by a server determining apparatus, the method comprising:
  a first receiving step of the server determining apparatus receiving a first inquiry from a first information distribution server as to which one of a plurality of information distribution servers a client should access based on a first access request received by the first information distribution server from the client;
  a collection step of the server determining apparatus collecting, from each of the plurality of information distribution servers, state information of each of the plurality of information distribution servers;
  a first server determination step of the server determining apparatus determining, based on a logical distance between the client and each of the plurality of information distribution servers, which one of the plurality of information distribution servers should be accessed by the client which submitted the first access request to the first information distribution server;
  a first informing step of the server determining apparatus informing the first information distribution server of the one of the plurality of information distribution servers that the client should access determined by the first server determination step;
  a second receiving step of the server determining apparatus receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first information distribution server information indicating the determined one of the plurality of information distribution servers informed by the first informing step;

a second server determination step of the server determining apparatus determining, based on state information of each of the information distribution servers collected by said collecting step between the time that the first inquiry is received by the first receiving step and the time that the second inquiry is received by the second receiving step, which one of the plurality of information distribution servers should be accessed by the client; and a second informing step of the server determining apparatus informing the one of the plurality of information distribution servers that submitted the second inquiry received by the second receiving step which one of the plurality of information distribution servers that the client should access determined by the second server determination step.

19. The method according to claim 18, wherein said first and second server determination steps determine one of a plurality of sites provided with the plurality of information distribution servers, and determines the one of the plurality of information distribution servers in the determined one of the plurality of sites.

20. The method according to claim 18, wherein said collecting step further comprises collecting at least one information of a response time, a number of router steps, and a packet loss ratio between said client and each of the plurality of information distribution servers.

21. The method according to claim 18, wherein said state information comprises network state information in a plurality of sites provided with the plurality of information distribution servers.

22. The method according to claim 18, wherein said collecting step comprises collecting at least one information of a congestion degree, a number of packets, and a number of packet errors in a plurality of sites proved with the plurality of information distribution servers.

23. The method according to claim 18, wherein said collecting step comprises collecting at least one information of a CPU load ratio, a CPU idle value, a number of connection links, and a disk load ratio of each of said plurality of information distribution servers.

24. The method according to claim 18, wherein each of the plurality of information distribution servers includes the first information distribution server.

25. A computer-readable storage medium storing a computer readable server determining program executed by a server determining apparatus, the program comprising:

a first receiving step of the server determining apparatus receiving a first inquiry from a first information distribution server as to which one of the plurality of information distribution servers a client should access based on a first access request received by the first one of the plurality of information distribution servers from the client;

a collecting step of the server determining apparatus collecting, from the plurality of information distribution servers, network state information between the client and each of the plurality of information servers;

a first server determining step of the server determining apparatus determining, based on a logical distance between the client and each of the plurality of information distribution servers, which one of the plurality of information distribution servers should be accessed by the client which submitted the first access request to the first one of the plurality of the information distribution servers;

a first informing step of the server determining apparatus informing the first information distribution server of the one of the plurality of information distribution servers that the client should access determined by the first server determining step;

a second receiving step of the server determining apparatus receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first one of the information distribution servers information indicating the determined one of the plurality of information distribution servers informed by the first informing step;

a second server determining step of the server determining apparatus determining, based on network state information collected by said collecting step between the time that the first inquiry is received by the first receiving step and the time that the second inquiry is received by the second receiving step, which one of the plurality of information distribution servers should be accessed by the client; and a second informing step of the server determining apparatus informing the one of the plurality of information distribution servers that submitted the inquiry received by the second receiving step which one of the plurality of information distribution servers that the client should access determined by the second server determining step.

26. The storage medium according to claim 25, wherein said collecting step comprises collecting at least one of a response time, a number of router steps, and a packet loss ratio between said client and each of the plurality of information distribution servers.

27. The storage medium according to claim 25, wherein, said collecting step comprises collecting at least one of a congestion degree, a number of packets, and a number of packet errors.

28. The storage medium according to claim 25, wherein, as the state information, said collecting step comprises collecting at least one of a CPU load ratio, a CPU idle value, a number of connection links, and a disk load ratio of each of the plurality of information distribution servers.

29. The storage medium according to claim 25, wherein the each of the plurality of information distribution servers includes the first information distribution server.

30. A computer-readable storage medium storing a computer readable server determining program executed by a server determining apparatus, the program comprising:

a first receiving step of the server determining apparatus receiving a first inquiry from a first information distribution server as to which one of a plurality of information distribution servers a client should access based on a first access request received by the first information distribution server from the client;

a collecting step of the server determining apparatus collecting, from each of the plurality of information distribution servers, state information of each of a plurality of information distribution servers;

a first server determining step of the server determining apparatus determining, based on a logical distance between a client and each of the plurality of information distribution servers, which one of the plurality of information distribution servers should be accessed by the client which submitted the first access request to the first information distribution servers;

a first informing step of the server determining apparatus informing the first information distribution server of the one of the plurality of information distribution servers that the client should access determined by the first server determining step;

a second receiving step of the server determining apparatus receiving a second inquiry from the determined one of the plurality of information distribution servers as to which one of the plurality of information distribution servers the client should access based on a second access request received by the determined one of the plurality of information distribution servers from the client, wherein the second access request received by the determined one of the information distribution servers is initiated by the client in response to receipt by the client from the first information distribution server information indicating the determined one of the plurality of information distribution servers informed by the first informing step;

a second server determination step of the server determining apparatus determining, based on state information of each of the information distribution servers collected by said collecting step between the time that the first inquiry is received by the first receiving step and the time that the second inquiry is received by the second receiving step, which one of the plurality of information distribution servers should be accessed by the client; and a second informing step of the server determining apparatus informing the one of the plurality of information distribution servers that submitted the second inquiry received by the second receiving step which one of the plurality of information distribution servers that the client should access determined by the second server determination step.

31. The storage medium according to claim 30, wherein said first and second server determining steps determine one of a plurality of sites provided with the plurality of information distribution servers, and determines the one of the plurality of information distribution servers in the determined one of the plurality of sites.

32. The storage medium according to claim 30, wherein said collecting step comprises collecting at least one information of a response time, a number of router steps, and a packet loss ratio between said client and each of the plurality of information distribution severs.

33. The storage medium according to claim 30, wherein said state information further comprises network state information in a plurality of sites provided with the information distribution servers.

34. The storage medium according to claim 30, wherein said collecting step further comprises collecting at least one information of a congestion degree, a number of packets, and a number of packet errors.

35. The storage medium according to claim 30, wherein said collecting step comprises collecting at least one information of a CPU load ratio, a CPU idle value, a number of connection links, and a disk load ratio of each of the plurality of information distribution servers.

36. The storage medium according to claim 30, wherein each of the plurality of information distribution servers includes the first information distribution server.

* * * * *

UNITED STATES PATENT AND TRADEMARK OFFICE
CERTIFICATE OF CORRECTION

| | |
|---|---|
| PATENT NO. | : 7,353,291 B1 |
| APPLICATION NO. | : 09/597145 |
| DATED | : April 1, 2008 |
| INVENTOR(S) | : Ogino |

It is certified that error appears in the above-identified patent and that said Letters Patent is hereby corrected as shown below:

COLUMN 10:
        Line 44, "are" should read -- is --;
        Line 47, "are" should read -- is --; and
        Line 56, "are" should read -- is --.

COLUMN 11:
        Line 50, "are" should read -- is --; and
        Line 57, "are" should read -- is --.

COLUMN 12:
        Line 2, "these" should read -- this --;
        Line 3, "to determine" should read -- determines --;
        Line 4, "these" (both occurrences) should read -- this --.

COLUMN 17:
        Line 16, "provided" should read -- provided with --;
        Line 65, "servers" should read -- servers, --.

COLUMN 18:
        Line 67, "server" should read -- server, --.

COLUMN 19:
        Line 38, "proved" should read -- provided --.

COLUMN 20:
        Line 43, "wherein," should read -- wherein --; and
        Line 53, "the" (1st occurrence) should be deleted.

UNITED STATES PATENT AND TRADEMARK OFFICE
CERTIFICATE OF CORRECTION

PATENT NO. : 7,353,291 B1
APPLICATION NO. : 09/597145
DATED : April 1, 2008
INVENTOR(S) : Ogino It is certified that error appears in the above-identified patent and that said Letters Patent is hereby corrected as shown below:

COLUMN 22:
    Line 17, "severs." should read -- servers. --.

Signed and Sealed this

Twenty-eighth Day of October, 2008

JON W. DUDAS
*Director of the United States Patent and Trademark Office*